United States Patent
Ruvolo et al.

(10) Patent No.: US 6,604,079 B1
(45) Date of Patent: Aug. 5, 2003

(54) SYSTEM AND METHOD FOR FEEDING E-MAIL WITH CALENDAR DATA

(75) Inventors: Joann Ruvolo, San Jose, CA (US); Stefan B. Edlund, Sunnyvale, CA (US); Daniel Alexander Ford, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/531,017

(22) Filed: Mar. 20, 2000

(51) Int. Cl.[7] ............................................. G06F 17/60
(52) U.S. Cl. ...................................................... 705/1
(58) Field of Search ........................ 705/9, 1; 709/206, 709/207

(56) References Cited

U.S. PATENT DOCUMENTS

| | | | | |
|---|---|---|---|---|
| 4,977,520 | A | 12/1990 | McGaughey et al. | 364/521 |
| 5,050,077 | A | 9/1991 | Vincent | 364/401 |
| 5,261,045 | A | 11/1993 | Scully et al. | 395/161 |
| 5,303,145 | A | 4/1994 | Griffin et al. | 364/401 |
| 5,323,314 | A | 6/1994 | Baber et al. | 364/401 |
| 5,428,784 | A | 6/1995 | Cahill, Jr. | 395/650 |
| 5,664,063 | A | 9/1997 | Johnson et al. | 395/101 |
| 5,842,009 | A | 11/1998 | Borovoy et al. | 395/601 |
| 5,867,822 | A | 2/1999 | Sankar | 705/8 |
| 5,870,548 | A | * 2/1999 | Nielsen | 709/206 |
| 5,895,468 | A | * 4/1999 | Whitmyer, Jr. | 707/10 |
| 5,960,406 | A | 9/1999 | Rasansky et al. | 705/9 |
| 6,064,977 | A | * 5/2000 | Haverstock et al. | 705/9 |
| 6,272,532 | B1 | * 8/2001 | Feinleib | 709/206 |
| 6,480,830 | B1 | * 11/2002 | Ford et al. | 705/9 |

FOREIGN PATENT DOCUMENTS

WO WO 99/67718 * 12/1999 ........... G06F/15/16

OTHER PUBLICATIONS

"Web Calendaring and Online Organization is Effortless with GO Organizer", Nov. 8, 1999, Business Wire.*
Vincent et al., "Computer Notification of a Meeting," *IBM Technical Disclosure Bulletin*, Jan. 1984, vol. 26, No. 8, p. 4379.
IBM Technical Disclosure Bulletin, "Vocalized Appointment Cancellation Informer," Aug. 1993, vol. 36, No. 8, pp. 513–515.

* cited by examiner

*Primary Examiner*—John G. Weiss
*Assistant Examiner*—Jonathan Ouellette
(74) *Attorney, Agent, or Firm*—Lacasse & Associates, LLC; Randy W. Lacasse; Alison D. Mortinger, Esq.

(57) ABSTRACT

Calendar entries provide for a wealth of information. For example, for a meeting, information such as the start date, subject, attendees, and location are provided. Yet, when writing a follow up e-mail, that's exactly the information a user has to copy/or cut and paste from the calendar entries to the e-mail. Significant time is saved by automatically finding the relevant calendar entry(ies), extracting the known information, and augmenting that information into the e-mail and sending it via a server.

17 Claims, 4 Drawing Sheets

FLOWCHART

SYSTEM AND METHOD FOR FEEDING EMAIL WITH CALENDAR DATA

SYSTEM AND METHOD FOR FEEDING E-MAIL WITH CALENDAR DATA

BACKGROUND OF THE INVENTION

1. Field of Invention

The present invention relates generally to the field of electronic calendar systems. More specifically, the present invention is related to a system and method for feeding e-mail with calendar data.

The following definitions may assist in the understanding of terminology used throughout the specification:

calendar store—contains calendars, one per entity. Each calendar can contain calendar objects. The Internet Calendaring and Scheduling Core Object Specification (iCalendar) is one standard for defining the format of calendar objects (e.g., components, properties). A component is defined as an event, to-do, reminder, etc.

event—In the iCalendar standard, an event is defined as a group of properties associated with an event calendar component. However, in the terminology of this disclosure, an event is broadly defined as synonymous with a calendar component (e.g., it does not preclude a to-do activity.)

client—a calendar user. Associated with a client are his/her calendar events and contact list/address book.

contact—a person in at least one client's contact list. In effect, a contact can also be a client, if he/she is a calendar user.

attendee—a person who participates in an event (e.g., a meeting). An attendee can also be a client, if he/she is a calendar user.

Calendar Access Protocol (CAP)—the mechanism to access calendar applications across system boundaries using any suitable access protocol or similar technology.

2. Discussion of Prior Art

Electronic calendar systems are a widely used resource in today's society. Electronic calendar systems contain information about events, such as what the event is, when the event will occur, and where it will occur. Attributes about the owner of a calendar, where the owner may be person, a community organization, or business, are contained in the calendaring systems. Attributes describe the owner and the owner's preferences. Use of calendar systems help an owner manage their time, provide reminders to the owner, and allow an owner to summarize events that occurred on a specified date. Calendar entries provide a wealth of information. For example, for a meeting, information such as the start date, subject, attendees, and location are provided.

Calendar systems have been implemented in computers by programs like GROUPWISE® by Novell®, Inc. and OUTLOOK®, by Microsoft®, Inc., to maintain schedules and appointments. The functionality of most of the calendaring systems that are available today are usually limited to local area network (LAN) or have very little, if any, interaction with other network environments. The current calendar systems also have limited or no interaction with other communication applications.

A commonly used resource today in the field of communications is electronic mail or 'e-mail'. Computer networks allow users in a LAN or a wide area network (WAN), for example, to communicate with one another using e-mail. Usually, e-mail messages are just text, but they can also have attachments that can contain various types of files such as images, voice, etc.

A significant portion of e-mail is in response to calendar events (e.g., meetings). When writing a follow up e-mail regarding a meeting, information such as the date, subject, attendees, and location are usually needed. For example, in an e-mail to a remote user, one might say, "Stanley, when we last met on abc, we discussed xyz." As illustrated in FIG. 1, in order to write that sentence, a user 100 composing an e-mail has to first search through his/her personal calendar 102 looking for the entry for the meeting with Stanley and if found, a copy or cut of the relevant information 104 is performed. As a next step, the user 100 pastes the information 106 in the e-mail 108 and sends it via a mail server 110. Therefore, a need exists for a user to be able to automatically access information regarding specifics of a meeting while sending follow up e-mail to a client.

The following references describe electronic calendaring systems with little or no interaction with the network or any other communication media. The prior art described below require manual user interaction with calendaring systems (very similar to method described in FIG. 1).

The U.S. Pat. No. 4,977,520 describes an improved electronic calendaring process. McGaughey et al. outline a method for responding to an electronic meeting notice by presenting on one screen, in a side by side relationship, the details of the meeting notice and the relevant portion of the owner's calendar.

The U.S. Pat. No. 5,428,784 teaches a method and apparatus for a dynamic calendar response to an electronic message in a data processing system. An electronic calendar is searched for any scheduled event overlapping a time of receipt of an electronic message and a display is sent back to the sender providing information about the scheduled event.

The U.S. Pat. No. 5,842,009 provides an improved method and apparatus for automatically providing the user with existing documents and information relevant to a scheduled event.

The U.S. Pat. No. 5,867,822 describes a new and improved electronic calendar using new enterprise protocols and mechanisms to implement an enterprise electronic calendar. The protocol checking process (PCP) determines compliance of a user's activity with the protocol and provides feedback in the form of reminders, e-mail, etc. to the user through the GUI.

The U.S. Pat. No. 5,960,406 describes a method for scheduling meetings, appointments, announcements, and forms of communication by means of a computerized system. The reference also further discloses that the method described in the patent is particularly useful in communicating over the Internet or World Wide Web, assisted by e-mail.

The U.S. Patents assigned to Vincent (U.S. Pat. No. 5,050,077), Scully et al. (U.S. Pat. No. 5,261,045), Griffin et al. (U.S. Pat. No. 5,303,145), Baber et al. (U.S. Pat. No. 5,323,314), and Johnson et al. (5,664,063) all describe a calendar/meeting scheduling system.

IBM Technical Disclosure Bulletins 1/84 Pg. 4379 and 8/93 Pg. 513 describe a calendar/meeting scheduling system that allows users to manually manage their own computer calendaring.

The current invention eliminates the disadvantages (like copying/or cutting and pasting of relevant information from the calendar into the e-mail) posed by the prior art by providing a system and method for novel use of calendars by feeding e-mail with calendar data. The present invention also allows the user to save significant amount of time by automatically finding the relevant calendar entry, extracting the known information, and augmenting the information into the e-mail. Thus, the information regarding a prior meeting (like the start date, subject, attendees, and location) can be automatically inserted by the calendar system into the e-mail, without any manual effort on the part of the user.

SUMMARY OF THE INVENTION

The present invention provides for an improved system and method for feeding e-mail with calendar data. In addition, the present invention also saves a significant amount of time by providing a system and method to automatically find the relevant: calendar entry(s), extract the known information, and augment that information to the e-mail. Hence, the current invention provides for a more complete e-mail with greater accuracy.

A calendar client initiates an e-mail request to one of his/her contacts. The calendar system then searches the calendar store for client events where the contact was an attendee and extracts the relevant calendar data from the appropriate found event (e.g., most recent meeting). Subsequently, the calendar system augments the client typed e-mail message with the extracted calendar data and sends the e-mail request (via the mail server) to the contact.

DESCRIPTION OF THE PREFERRED EMBODIMENTS

Figure 1:
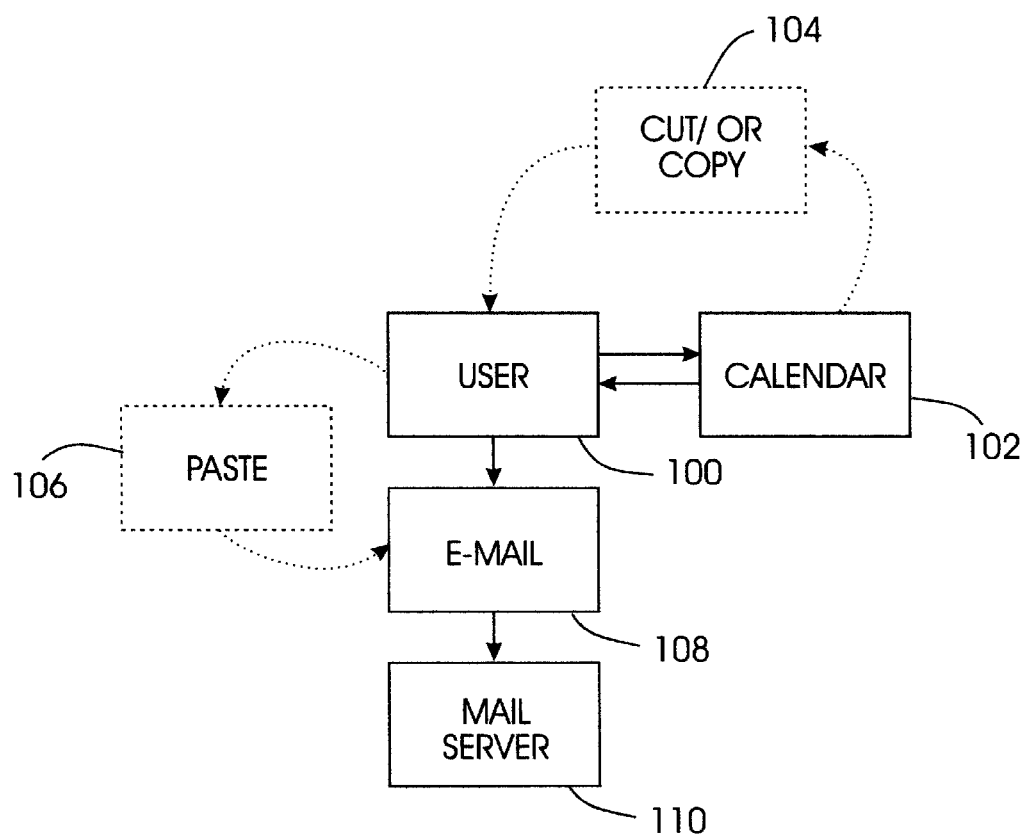
FIG. 1 illustrates prior art.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Internet Calendaring and Scheduling Core Object Specification (iCalendar) is one of the calendar standards for defining the format of calendar objects (e.g., components, properties), wherein a component is an event, todo, reminder, etc. The present invention utilizes the icalendar standard (or other equivalent calendar standards) for extracting the various organized calendar objects.

The Internet Calendaring and Scheduling Core Object Specification (iCalendar) provides a definition of a common format for openly exchanging calendaring and scheduling information across the Internet. The iCalendar specification defines the format of calendar objects, e.g. components, properties. The components are collections of properties which specify an event, a to-do, a journal entry, free/busy time information, time zone information, or an alarm entered into a calendar.

It should be noted, the iCalendar specification was first presented as RFC 2445 (Request For Comment 2445), and as is typical with RFCs continues to be a work in progress and may change over time. However, it is within the spirit of the present invention to utilize the original iCalendar specification, any subsequent modifications thereof or any other present of future calendaring format protocols. Additionally, the original iCalendar specification can be located at any RFC archive, such as http://www.faqs.org/rfcs/rfc-titles.html.

Figure 2:
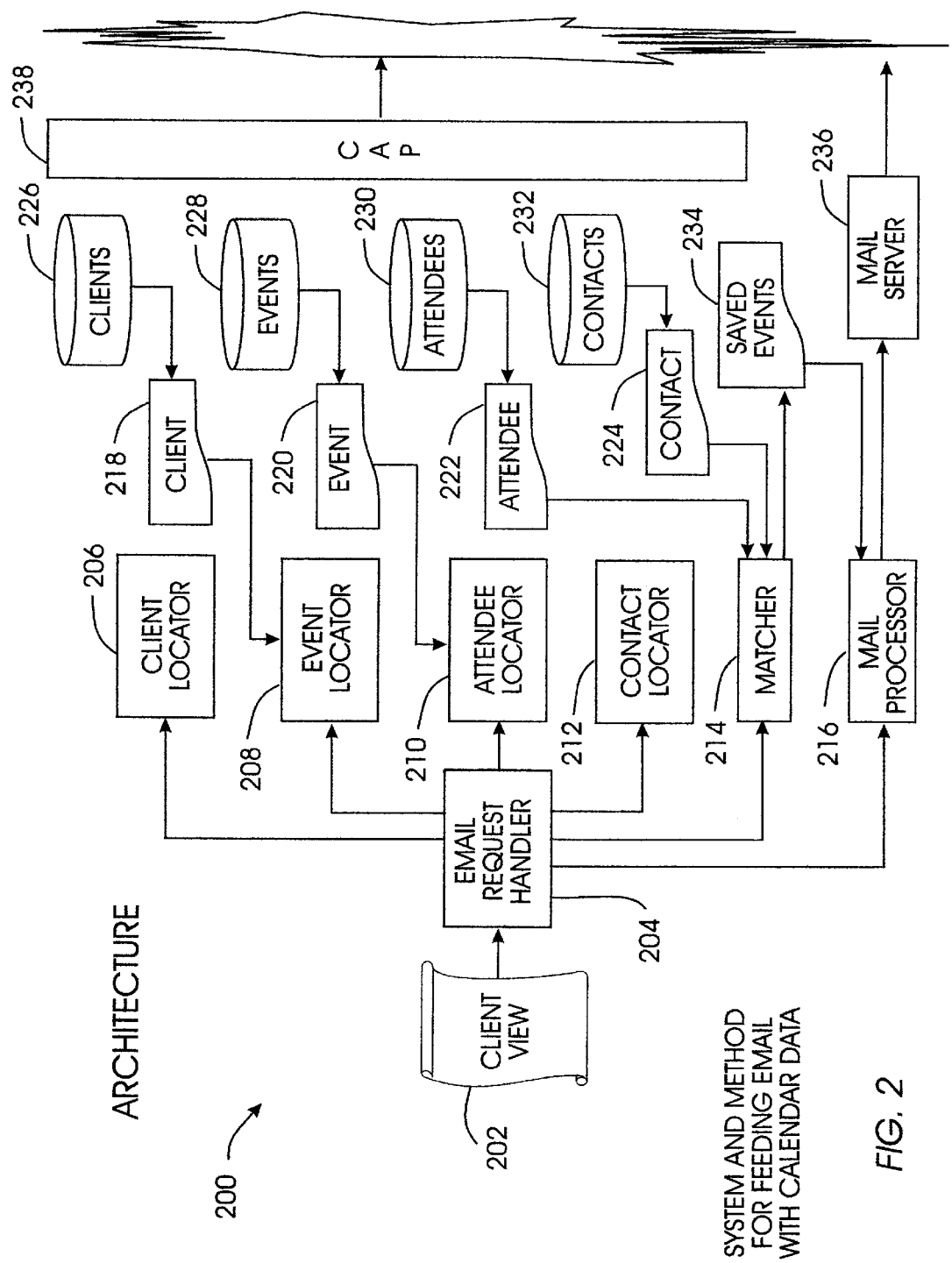
FIG. 2 illustrates the system architecture for sending e-mail through the calendar.

FIG. 2 illustrates the system architecture and method 200 for feeding e-mail with calendar data. The system architecture and method 200 includes: client view 202 enabling the calendar user to view the GUI's of the system via a computer monitor, an e-mail request handler 204 receiving e-mail requests from clients, via the client graphical user interface (GUI), "calendar access protocol" (CAP) 238 accessing calendar applications across system boundaries, a "matcher" 214 which when given the data representation for an attendee of an event and a contact, compares them to determine if they represent the same client and if so saves the given event, a mail processor 216 for finding the designated one (e.g., last event in chronological order) from a list of saved elements and extracting the relevant calendar data (e.g., start date, location, summary, detailed description, other attendees), and an mail server 236 for sending the e-mail via any suitable mail transport agents (e.g., SMTP).

The e-mail request handler 204 receives e-mail requests from the client, via a GUI displayed on the client view 202, and calls "client locator" 206, which accesses the "clients repository" 226 to find the data representing the designated client that initiated the request. In one embodiment, the clients repository 226 is a relational database, and the find operation is a SQL query, such as SELECT * FROM CALCLIENTTBL WHERE CLIENTNAME= 'first_name last_name'.

The data representing the client, in this instance: first_name and last_name, is stored locally or alternatively it is accessed remotely via CAP 238.

In the next step, the e-mail request handler 204 calls the "contact locator" 212 to locate the data representation of the designated contact. Contact locator 212 accesses the "contact repository" 232 to find the contacts associated with the client. Then the clients repository 226 is accessed to find the data representing the designated contact. Again, in one embodiment, the repositories are relational databases and the find operation is a SQL query. Data representing the contact is either stored locally or it is accessed remotely via CAP 238.

Next, the e-mail request handler 204 calls the "events locator" 208 to locate the data representation of the client's events. Events locator 208 accesses the "events repository" 228 to find the events associated with the client. Again, in one embodiment, the repositories are relational databases and the find operation is a SQL query. Data representing the event is either stored locally or it is accessed remotely via CAP 238.

As a next step, the e-mail request handler 204 calls the "attendees locator" 210 to locate the data representation of the attendees for the given event. The attendees locator 210 accesses the "attendees repository" 220 to find the attendees associated with a given event. Then the clients repository 226 is accessed to find the data representing the designated attendee. Again, in one embodiment, the repositories are relational databases and the find operation is a SQL query. The data representing the attendee is stored locally or it is accessed remotely via CAP 238.

Next, the e-mail request handler 204 calls the matcher 214 to determine if the attendee and contact are the same client. Then, the matcher 204 saves the event.

Lastly, the e-mail request handler 204 calls the mail processor 216 to extract the calendar data from the given event and build/send the e-mail via a mail server 236. The mail processor 216 looks for the saved events, finds the designated one (e.g., last event in chronological order) and extracts from the event, the relevant calendar data (e.g., start date, location, summary, detailed description, other attendees), and builds an e-mail message by augmenting the client entered message with the extracted calendar data.

Figure 3:
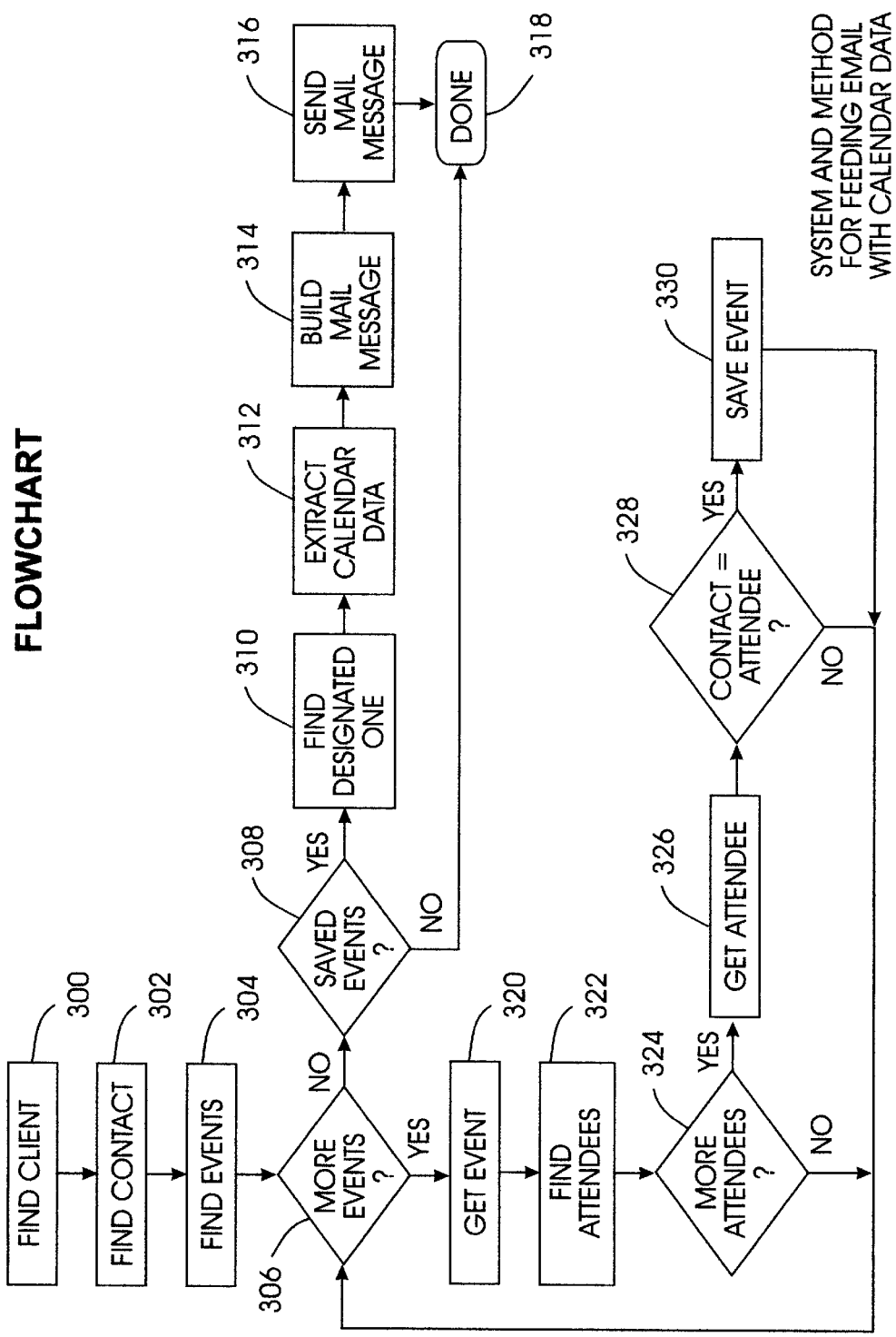
FIG. 3 illustrates a flowchart for sending e-mail through the calendar.

FIG. 3 illustrates the steps, by means of a flow chart, of the present method of invention for feeding e-mail with calendar data. The process is started by finding the client 300 in the clients repository 226 via the client locator 206 (FIG. 2). The contacts repository 232 (FIG. 2) is then searched for finding and locating the contacts associated with the client 302. Next, a search is performed in the events repository 228 (FIG. 2) for finding the events 304 associated with the client. A check is then performed for more events 306 and if the method retrieves the events 320, then the attendees are located and a check is performed for more attendees 324. If there are no more attendees, then the method checks for more events 306, otherwise it locates the attendee data representation 326 and performs a check on whether or not contact is the same as the attendee 328. In the event the contact and attendee are matched, the event is saved 330 and the method returns to check for more events 306. Alternatively, if the contact is not the same as the attendee, the event is not saved and the method returns to check for more events 306. In the instance where there are no more events, the method checks to see if there are any saved events 308 and if none are found it quits 318. But, if saved events are found, the method finds the designated event 310, extracts the calendar data 312, and builds an e-mail message 314 and sends the e-mail message 316 via the mail server 236 (FIG. 2).

Figure 4:
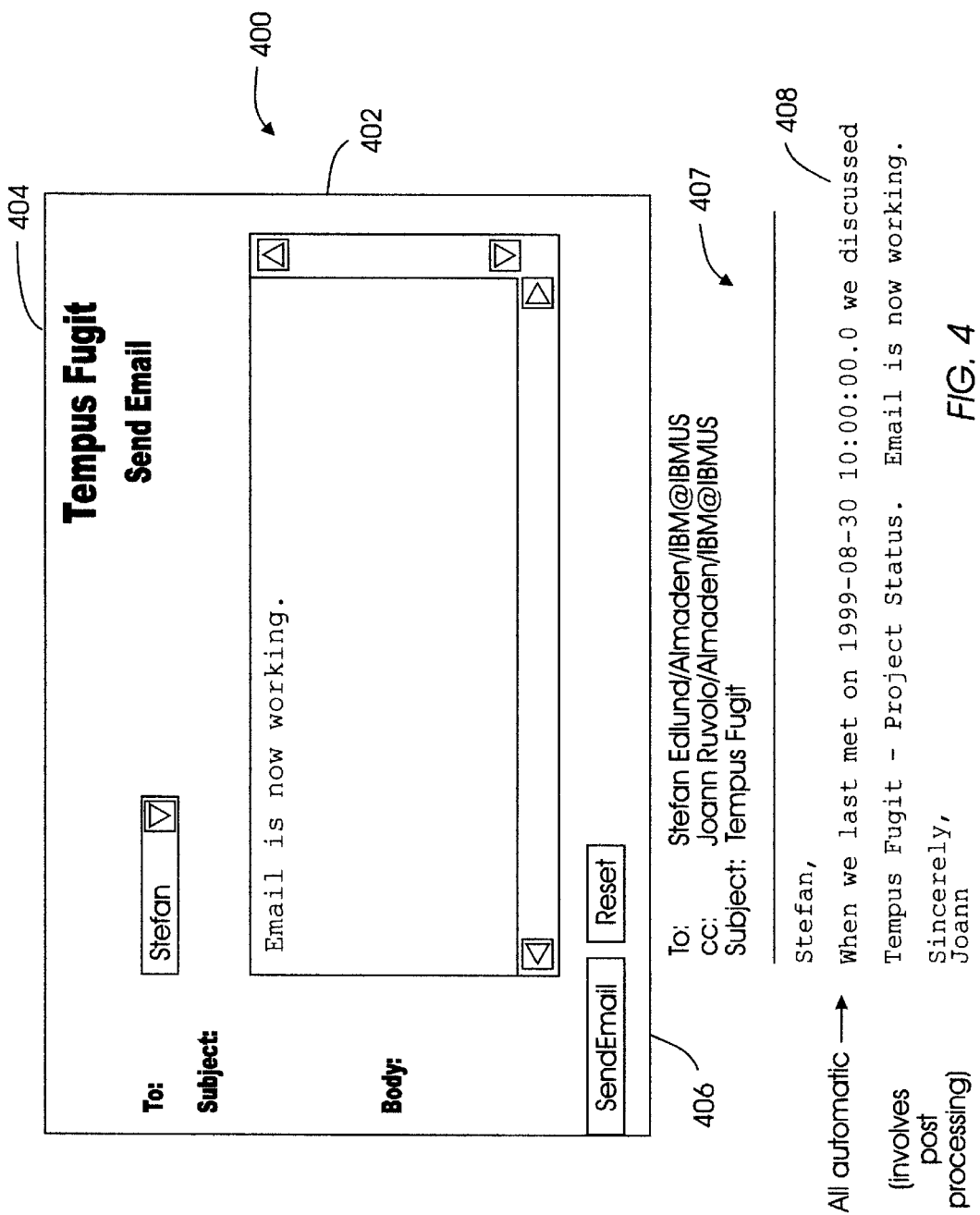
FIG. 4 illustrates a sample screenshot of a working model embodiment.

FIG. 4 illustrates a screenshot of a working model embodiment feeding e-mail with calendar data. Screenshot 400 depicts a GUI for sending e-mail. The user selects 'Stefan', (a recipient whom the e-mail is addressed to) in the "To:" field 404 and then proceeds to type the text in the "Body:" field 402 ('Email is now working'). When the user clicks on the "SendEmail" button 406, the name, 'Stefan', in "To:" field 404 is automatically looked up in the calendar and the details regarding the last meeting 408 is augmented onto the e-mail before sending it to the mailserver 236 (FIG. 2). The recepient, 'stefan', recieves the e-mail 407 with the calendar data 408 in the body.

Unlike the prior art methods, no manual entry of prior calendar/meeting data is required since the data is automatically added on to the outgoing e-mail.

The above enhancements for icons and its described functional elements are implemented in various computing environments. For example, the present invention may be implemented on a conventional IBM PC or equivalent, multi-nodal system (e.g. LAN) or networking system (e.g. Internet, WWW). All programming, GUIs, display panels and dialog box templates, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of electronic messaging and calendar systems.

CONCLUSION

A system and method has been shown in the above embodiments for the effective implementation of a system and method for feeding e-mail with calendar data. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific iconic color or symbol schemes. In addition, the specific chosen calendaring items and the procedure of selecting details of the last meeting are representative of the preferred embodiment and should not limit the scope of the invention.

We claim:

1. A system for automatically augmenting e-mail messages with calendar data, said system comprising:

a. a client locator which locates a data representation of a client initiating an e-mail request;

b. a contact locator which locates a data representation of a contact selected by said client;

c. an events locator which locates a data representation of said client's events;

d. an attendees locator which locates a data representation of attendees for a given event;

e. a matcher to determine if an attendee and a contact are the same;

f. a mail processor to extract available calendar data from a given event and to build a client initiated e-mail message;

g. a mail transport agent, and an e-mail request handler which upon receiving e-mail requests from the client uses elements a–g to locate client events where the contact was an attendee, extract the calendar data from a found event, augments said client initiated e-mail message with the extracted calendar data, and send the e-mail request to the contact.

2. A system for automatically augmenting e-mail messages with calendar data, as per claim 1, wherein the client locator fetches the data representation of a client that initiates a request from a clients repository.

3. A system for automatically augmenting e-mail messages with calendar data, as per claim 1, wherein the contact locator fetches the data representation of a designated contact from a contacts repository.

4. A system for automatically augmenting e-mail messages with calendar data, as per claim 1, wherein the events locator fetches the data representation of a client's events from an events repository.

5. A system for automatically augmenting e-mail messages with calendar data, as per claim 1, wherein the attendees locator fetches the data representation of attendees for the given event from an attendees repository.

6. A system for automatically augmenting e-mail messages with calendar data, as per claim 1, wherein the server used as the mail transport agent is any of a mail, world wide web, chat, and FTP server.

7. A system for automatically augmenting e-mail messages with calendar data, as per claim 1, wherein calendar data is accessed locally or remotely via calendar access protocol (CAP).

8. A system for automatically augmenting e-mail messages with calendar data, as per claim 1, wherein calendar data is stored in relational databases that can be accessed via SQL.

9. A method of feeding client initiated e-mail with calendar data comprising the steps:

receiving a client initiated e-mail request to one of their contacts;

searching a calendar store for client events where the contact was an attendee;

extracting one or more fields of said calendar data from a located event;

augmenting a client initiated e-mail message with the extracted calendar data, and sending the e-mail request to the contact.

10. A method of feeding e-mail with calendar data, as per claim 9, wherein said located event is the most recent meeting.

11. A method of feeding e-mail with calendar data, as per claim 9, wherein said sending step uses an agent that is any of a mail, world wide web, chat, and FTP server.

12. A method for feeding e-mail with calendar data, as per claim 9, wherein said calendar data is accessed locally or remotely via calendar access protocol (CAP).

13. A method for feeding e-mail with calendar data, as per claim 9, wherein said calendar data is stored in relational databases that can be accessed via SQL.

14. A method for feeding e-mail with calendar data, as per claim 9, wherein said e-mail request is sent using a mail server.

15. A method for augmenting client initiated e-mail with calendar data among distributed computer based-systems over a network which controls access to calendaring information comprising:

receiving a client initiated e-mail request to one of their contacts;

searching a calendar store for client events where the contact was an attendee;

extracting one or more fields of said calendar data from a located event;

augmenting a client initiated e-mail message with the extracted calendar data, and sending the e-mail request to the contact via a server.

16. A system for automatically augmenting e-mail messages with calendar data, comprising computer readable program code, said program code embodied upon and divided among multiple computer storage systems, said program code processing data between the divided portions of said program code over a network for controlling access to personal calendaring information, comprising:

a client locator which locates a data representation of the client that initiated an e-mail request;

a contact locator which locates a data representation of a contact selected by said client;

an events locator which locates a data representation of said client's events;

an attendees locator which locates a data representation of attendees for a given event;

a matcher to determine if an attendee and a contact are the same;

a mail processor to extract the calendar data from the given event and builds the e-mail;

a mail transport agent, and an e-mail request handler which upon receiving e-mail requests from the client, locates client events where the contact was an attendee and extracts the relevant calendar data from a found event, and augments the client initiated e-mail message with the extracted calendar data and sends the e-mail request to the contact.

17. An article of manufacture comprising a computer user medium having computer readable program code embodied therein which feeds client initiated e-mail request, said e-mail intended for a selected contact, with calendar data comprising:

computer readable program code receiving said client initiated e-mail request; computer readable program code which searches a calendar store for client events where the contact was an attendee;

computer readable program code which extracts one or more fields of said calendar data from the located event;

computer readable program code which augments the client initiated e-mail request with the extracted calendar data, and computer readable program code which sends the e-mail request to the contact via a server.

\* \* \* \* \*